United States Patent
Kao

(10) Patent No.: US 9,781,489 B2
(45) Date of Patent: Oct. 3, 2017

(54) DIGITAL VIDEO BROADCASTING—TERRESTRIAL (DVB-T) SYSTEM AND MODULATION METHOD THEREOF

(71) Applicant: ATEN International Co., Ltd., New Taipei (TW)

(72) Inventor: Kuo-feng Kao, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 92 days.

(21) Appl. No.: 14/643,162

(22) Filed: Mar. 10, 2015

(65) Prior Publication Data

US 2016/0066057 A1 Mar. 3, 2016

(30) Foreign Application Priority Data

Sep. 2, 2014 (TW) .............................. 103130278 A

(51) Int. Cl.
*H04N 21/647* (2011.01)
*H04H 20/76* (2008.01)
(Continued)

(52) U.S. Cl.
CPC ...... *H04N 21/64738* (2013.01); *H04H 20/12* (2013.01); *H04H 20/76* (2013.01); *H04N 21/2383* (2013.01); *H04N 21/4263* (2013.01); *H04N 21/42615* (2013.01); *H04N 21/4382* (2013.01); *H04N 21/43632* (2013.01);
(Continued)

(58) Field of Classification Search
None
See application file for complete search history.

(56) References Cited

U.S. PATENT DOCUMENTS 5,862,141 A   1/1999   Trotter
6,424,683 B1 *  7/2002   Schollhorn ............. H04L 27/38
                                                  375/332
(Continued)

FOREIGN PATENT DOCUMENTS

CN   101098440   1/2008
TW   200840363   10/2008

OTHER PUBLICATIONS

Taiwanese Office Action, dated Oct. 21, 2015, in a counterpart Taiwanese patent application, No. TW 103130278.
(Continued)

*Primary Examiner* — Nathan Flynn
*Assistant Examiner* — Christine Kurien
(74) *Attorney, Agent, or Firm* — Chen Yoshimura LLP

(57) ABSTRACT

The present invention provides a digital video broadcasting-terrestrial (DVB-T) system and modulation method thereof. The system comprises a transmission module and a receiving module. The transmission module modulates a video signal to a DVB-T signal. The receiving module receives the DVB-T signal via a transmission line and demodulates the DVB-T signal to the video signal, and at the same time, monitoring the signal-to-noise ratio (SNR) or bit error rate (BER), and quantizes them to a reference data. The receiving module transmits the reference data to the transmission module through the same transmission line. The system can determine a control parameter according to the reference data to set the modulation parameter of the DVB-T signal.

18 Claims, 8 Drawing Sheets

(51) Int. Cl.
*H04N 21/2383* (2011.01)
*H04N 21/426* (2011.01)
*H04H 20/12* (2008.01)
*H04N 21/4363* (2011.01)
*H04N 21/438* (2011.01)
*H04N 21/4402* (2011.01)
*H04N 21/442* (2011.01)
*H04N 21/61* (2011.01)

(52) U.S. Cl.
CPC ........... *H04N 21/44209* (2013.01); *H04N 21/440263* (2013.01); *H04N 21/6112* (2013.01)

(56) References Cited

U.S. PATENT DOCUMENTS

| | | | | |
|---|---|---|---|---|
| 6,931,659 | B1* | 8/2005 | Kinemura | H04L 1/0002 370/252 |
| 6,968,017 | B2 | 11/2005 | Nielsen | |
| 7,693,032 | B2 | 4/2010 | Li et al. | |
| 2002/0106018 | A1 | 8/2002 | D'Luna et al. | |
| 2003/0095210 | A1* | 5/2003 | Huntley | H04N 5/268 348/705 |
| 2005/0030910 | A1* | 2/2005 | Robertson | H04L 5/143 370/276 |
| 2007/0189402 | A1* | 8/2007 | Yang | H04L 25/0232 375/260 |
| 2008/0165848 | A1 | 7/2008 | Ye et al. | |
| 2008/0253483 | A1* | 10/2008 | He | H04B 1/1036 375/316 |
| 2009/0091662 | A1* | 4/2009 | Chuang | H04N 5/455 348/726 |
| 2009/0249413 | A1* | 10/2009 | Karaoguz | H04N 21/235 725/105 |
| 2010/0162078 | A1* | 6/2010 | Miller | H04L 1/0003 714/755 |
| 2012/0147946 | A1 | 6/2012 | Gao et al. | |
| 2012/0182162 | A1* | 7/2012 | Currivan | H04B 1/10 341/51 |

OTHER PUBLICATIONS

Hazmi et al., "DVB-T signal in cable TV network: advantages and limitations", IEEE International Conference on Communications, Jun. 2001, pp. 2281-2285, vol. 7.

\* cited by examiner

DIGITAL VIDEO BROADCASTING—TERRESTRIAL (DVB-T) SYSTEM AND MODULATION METHOD THEREOF

BACKGROUND OF THE INVENTION

Field of the Invention

This invention relates to a Digital Video Broadcasting-Terrestrial (DVB-T) system and its modulation method, and in particular, it relates to such a system that can automatically adjusts the modulation and the resolution of the image.

Description of the Related Art

Conventionally, when using a Digital Video Broadcasting-Terrestrial (DVB-T) system or related technology to transmit video and audio data, the modulating modes of the transmitting end have a fixed setting; the transmitting end sets the settings, and then transmits the signals to the receiving end. For example, a television station sets the relevant parameters, then transmits the signals to the user. However, during signal transmission, due to factors such as distance, noise, and wire quality, the signals may be degraded, causing the receiving end to experience problems such as broken images, interruption, no display, etc.

While these problems may be improved or resolved by manual adjustments, making adjustments manually has also has difficulties. For example, when the distance between the transmitting end and the receiving end is far, it is difficult to realize manual adjustment. Also, when the transmission wires are aged, problems it causes can only be discovered when abnormalities are noticed at the receiving end.

SUMMARY OF THE INVENTION

Accordingly, the present invention is directed to a DVB-T system that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a digital video broadcasting-terrestrial (DVB-T) system, which includes: a transmitter module, for modulating a digital video signal into a digital video broadcasting-terrestrial (DVB-T) signal; and a receiver module, for receiving the DVB-T signal and demodulating it into the digital video signal for output, and for monitoring at least one of a signal-to-noise ratio (SNR) value and a bit error rate (BER) value of the DVB-T signal, and quantifying the monitored value into a first reference data and transmitting the first reference data to the transmitter module; wherein the transmitter module and the receiver module are coupled to each other by transmission wires for transmitting the DVB-T signal and the first reference data. The receiver module further monitors a decoding error rate for the DVB-T and quantifying it into a second reference data and transmitting the second reference data to the transmitter module.

The transmitter module may include: a mixer; a modulator, coupled to the mixer; a data compressor, coupled to the modulator; a first channel coupler, coupled to the mixer; a first low-pass filter, coupled to the first channel coupler; a first bi-directional communication module, coupled to the first low-pass filter; a first microcontroller unit (MCU), coupled to the first bi-directional communication module, the modulator and the mixer; an FPGA (field-programmable gate array), coupled to the first MCU and the data compressor; a first audio codec, coupled to the data compressor; and a first video interface, coupled to the FPGA.

The receiver module may include: a tuner; a demodulator, coupled to the tuner; a data decompressor, coupled to the demodulator; a second channel coupler, coupled to the tuner; a second low-pass filter, coupled to the second channel coupler; a second bi-directional communication module, coupled to the second low-pass filter; a second MCU, coupled to the second bi-directional communication module, the data decompressor, the demodulator and the tuner; a second audio codec, coupled to the data decompressor; and a second video interface, coupled to the data decompressor.

The receiver module can determine control parameters for setting modulation parameters and image resolution for the DVB-T signal based on the first and second reference data, and transmits the control parameters to the transmitter module via the second bi-directional communication module. Similarly, the transmitter module can determine control parameters for setting modulation parameters and image resolution for the DVB-T signal based on the first and second reference data.

In another aspect, the present invention provides a modulation method for a digital video broadcasting-terrestrial (DVB-T) system, the DVB-T system including at least a transmitter module and a receiver module, the transmitter module and the receiver module being coupled to each other via transmission wires, the method including: a second microcontroller unit (MCU) of the receiver module obtaining at least one of a signal-to-noise ratio (SNR) value and a bit error rate (BER) value of the DVB-T signal from a demodulator; the second MCU obtaining a decoding error rate for decompressing the video and audio signal; the receiver module determining whether the SNR value is less than a first threshold or the BER value is greater than a second threshold; the second MCU obtaining current modulation parameters for modulating a video and audio signal to generate the DVB-T signal; the receiver module obtaining adjusted modulation parameters using a lookup table; the receiver module estimating a maximum data transmission rate under the adjusted modulation parameters; the receiver module determining whether the maximum data transmission rate is greater than a current data rate of the video and audio signal; and if the maximum data transmission rate is determined to be greater than the current data rate, the receiver module generating control parameters based on the adjusted modulation parameters and transmitting the control parameters to the transmitter module.

The method may further include: the transmitter module receiving the control parameters; the transmitter module determining whether an image resolution of the video data is to be adjusted; if the image resolution of the video data is to be adjusted, the transmitter module adjusting settings of the image resolution; the transmitter module setting hardware modulation parameters for a modulator based on the control parameters; and generating an acknowledgement command and transmitting it to the receiver module. Further, the receiver module receives the acknowledgement command; and the receiver module re-sets demodulation parameters which correspond to the adjusted modulation parameters. Further, if the SNR is greater than the first threshold or the BER is less than the second threshold, the receiver module determines whether a decoding error rate is greater than a third threshold; and if the decoding error rate is greater than the third threshold, the receiver module requests the transmitter module to reduce an image resolution. Further, if the maximum data transmission rate is determined to be less than the current data rate, the receiver module requests the transmitter module to reduce an image resolution.

In another aspect, the present invention provides a modulation method for a DVB-T system, which includes: a second microcontroller unit (MCU) of the receiver module obtaining at least one of a signal-to-noise ratio (SNR) value and a bit error rate (BER) value of the DVB-T signal from a demodulator; the second MCU further obtaining an error rate when the receiver module decodes the DVB-T signal; and the receiver module transmitting the SNR, the BER and the error rate to the transmitter module.

The method further includes: the transmitter module receiving the SNR, BER and the error rate from the receiver module; the transmitter module determining whether the SNR value is less than a first threshold or the BER value is greater than a second threshold; a first MCU of the transmitter module obtaining current modulation parameters for modulating a video and audio signal to generate the DVB-T signal; the transmitter module obtaining adjusted modulation parameters using a lookup table; the transmitter module setting hardware modulation parameters for a modulator based on the adjusted modulation parameters; the transmitter module estimating a maximum data transmission rate under the adjusted modulation parameters; the transmitter module determining whether the maximum data transmission rate is greater than a current data rate of the video and audio signal; and if the maximum data transmission rate is determined to be greater than the current data rate, the transmitter module generating an acknowledgement command and transmitting it to the receiver module. The receiver module receives the acknowledgement command; and the receiver module re-sets demodulation parameters based on the acknowledgement command. If the SNR is greater than the first threshold or the BER is less than the second threshold, the transmitter module determines whether the decoding error rate is greater than a third threshold; and if the decoding error rate is greater than the third threshold, the transmitter module adjusts settings of the image resolution to a reduced image resolution.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
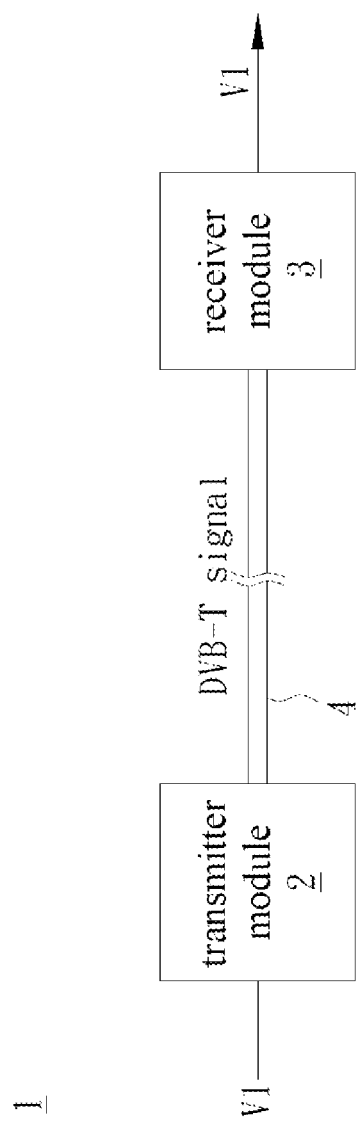
FIG. 1 schematically illustrates a Digital Video Broadcasting-Terrestrial (DVB-T) system according to an embodiment of the present invention.

Embodiments of the present invention are described below with reference to the drawings. While detailed illustrative embodiments of the present invention are disclosed herein, techniques, systems and operating structures in accordance with the present invention may be embodied in a wide variety of forms and modes, some of which may be quite different from those in the disclosed embodiment. Further, many well-known components are shown in the drawings without their detailed structures.

As shown in FIG. 1, the Digital Video Broadcasting-Terrestrial (DVB-T) system 1 according to an embodiment of the present invention preferably includes a transmitter module 2, a receiver module 3 and transmission wires 4 coupling them to each other. The transmitter module and receiver module can be one-to-one or one-to-many or many-to-one; a one-to-one system is used here as an example. In this embodiment, the transmission wire 4 is a co-axial cable, but it is not limited to such cable. The transmitter module 2 modulates the received digital video signal V1 to the DVB-T signal, and the receiver module 3 receives the DVB-T signal and demodulates it back to digital video signal V1 for display on a television screen or a display device. Meanwhile, the receiver module 3 monitors at least one of the signal-to-noise ratio (SNR) of the DVB-T signal and a bit error rate (BER) value, and quantifies it to a first reference data. The first reference data is transmitted to the transmitter module 2, to be used by the latter for modulating of the DVB-T signal. Further, the receiver module 3 also monitors the decoding error rate of the DVB-T signal, and quantifies it to a second reference data. The first second reference data is transmitted to the transmitter module 2, to be used by the latter for adjusting the image resolution of the DVB-T signal. It should be noted that the DVB-T signal, the first reference data and the second reference data are transmitted using the same transmission wires 4 (such as co-axial cable).

Figure 2:
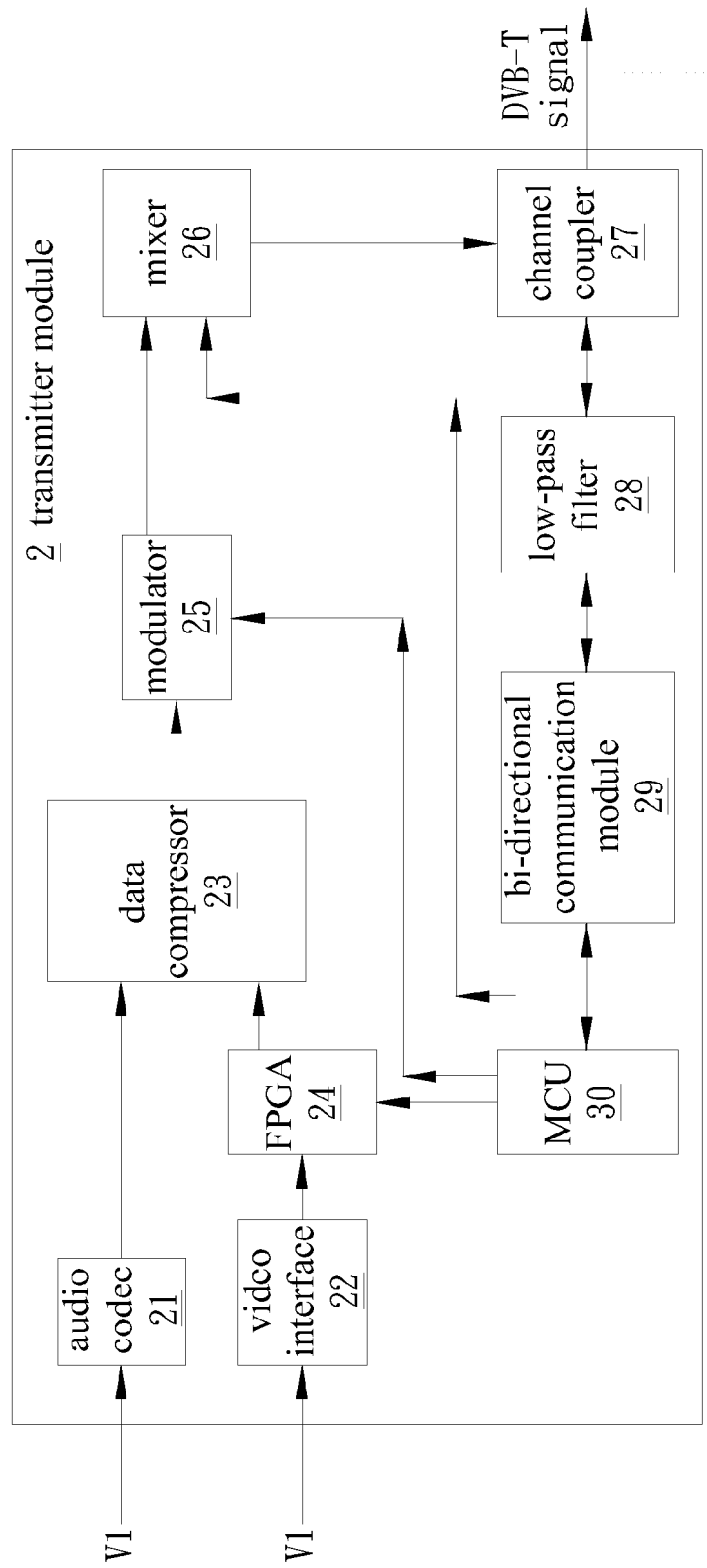
FIG. 2 is a block diagram of the transmitting module according to the embodiment.
Figure 3:
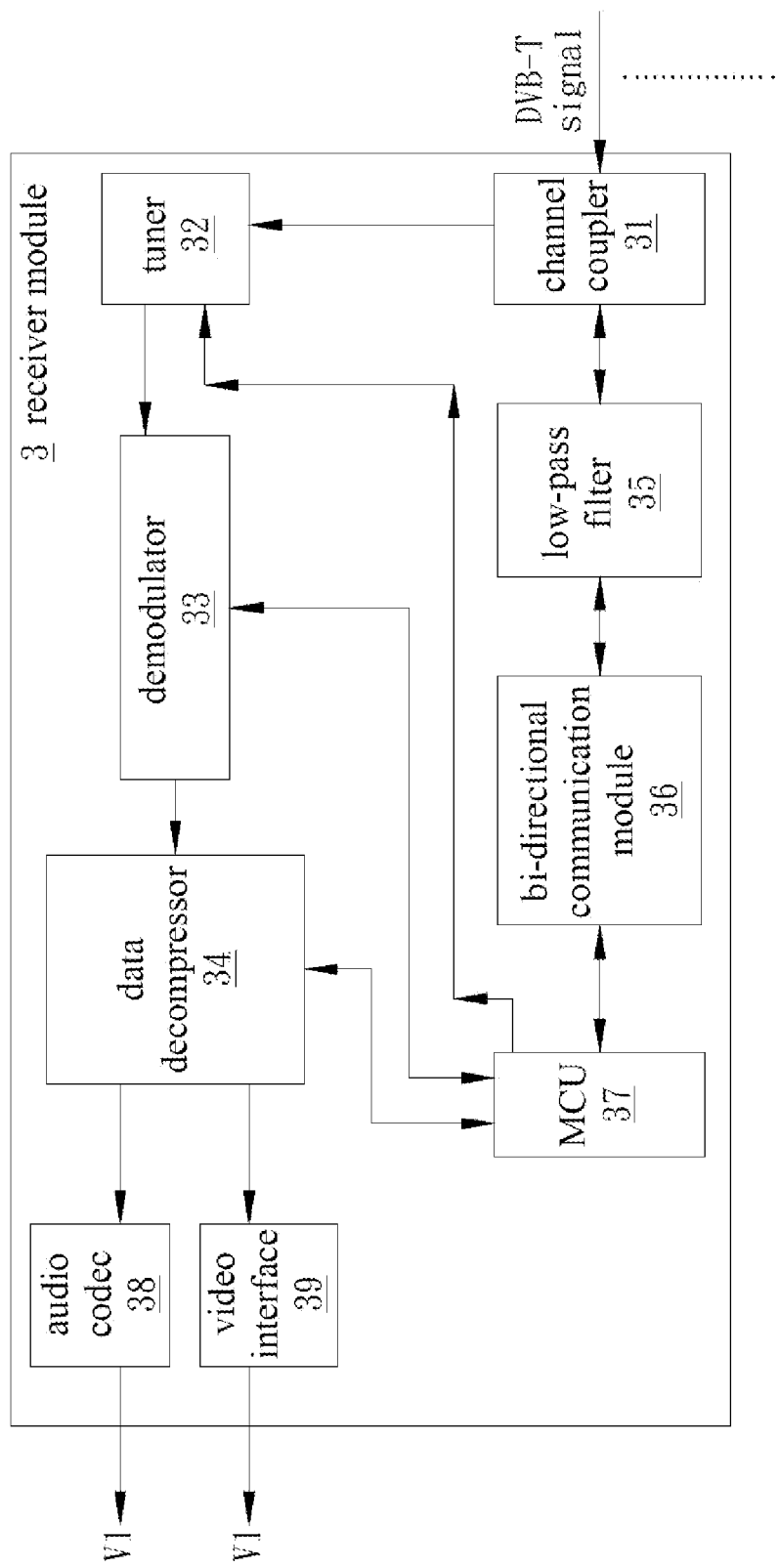
FIG. 3 is a block diagram of the receiving module according to the embodiment.

FIGS. 2 and 3 show further details. As shown in Fig., the transmitter module 2 of this embodiment preferably includes: a mixer 26 (e.g. UHF/VHF tuner); a modulator 25, coupled to the mixer 26; a data compressor 23 coupled to the modulator 25; a first channel coupler 27 coupled to the mixer 26 and the transmission wires; a first low-pass filter 28 coupled to the first channel coupler 27; a first bi-directional communication module 29 coupled to the first low-pass filter 28; a first microcontroller unit (MCU) 30 coupled to the first bi-directional communication module 29, the modulator 25, and the mixer 26; an FPGA (programmable gate array) 24, coupled to the first MCU 30 and the data compressor 23; a first audio codec 21 coupled to the data compressor 23; and a first video interface 22 coupled to the FPGA 24.

As shown in FIG. 3, the receiver module 3 of the present embodiment preferably includes: tuner (e.g. UHF/VHF) 32; demodulator 33 coupled to the tuner 32; data decompressor 34 coupled to the demodulator 33; a second channel coupler 31 coupled to the tuner 32 and the transmission wires; a second low-pass filter 35 coupled to the second channel coupler 31; a second bi-directional communication module 36 coupled to the second low-pass filter 35; a second MCU 37 coupled to the second bi-directional communication module 36, the data decompressor 34, the demodulator 33 and the tuner 32; a second audio codec 38 coupled to the data decompressor 34; and a second video interface 39 coupled to the data decompressor 34.

The digital video and audio signal V1 is inputted to the first audio codec 21 and first video interface 22 of the transmitter module 2, and then compressed by the data compressor 23. In this embodiment, the compression format may be but is not limited to MPEG or H.264. The compressed digital video and audio signal V1 is inputted to the modulator 25, which modulates the signal V1 into a DVB-T signal and sends it to the mixer 26. The mixer 26 transmits the DVB-T signal via VHF (very high frequency) or UHF (ultra high frequency) bands to the first channel coupler 27, which transmits the DVB-T signal via the transmission wires 4 (e.g. co-axial cable) to the receiver module 3.

The second channel coupler 31 of the receiver module 3 separates the received DVB-T signal into a high frequency signal and a low frequency signal. For example, the high frequency signal includes video and audio signals, and the low frequency signal includes communication protocol or control signals. The high frequency signal is sent to the tuner 32 and then to the demodulator 33. The demodulator 33 demodulates the DVB-T signal into a digital video and audio signal, and the data decompressor 34 decompresses it and sends the decompressed signals to the second audio codec 38 and the second video interface 39, which finally send the digital video and audio signal V1 to a display device such as a television set of a display screen for display. While transmitting the high frequency signal, the receiver module 3 uses the second low-pass filter 35 to obtain the low frequency signal and sends it to the second bi-directional communication module 36 and then to the second MCU 37. The second MCU 37 obtains the signal-to-noise ratio (SNR) and/or the bit error rate (BER) data from the demodulator 33, and quantifies it into a first reference data; and obtains the decoding error rate from the data decompressor 34, and quantifies it into a second reference data. Then, the second MCU 37 determines a set of control parameters based on the first and second reference data, and sends the control parameters to the transmitter module 2 via the second bi-directional communication module 36 and the transmission wires 4. In the transmitter module 2, the control parameters are forwarded via the first channel coupler 27 and first bi-directional communication module 29 to the first MCU 30. Base on these control parameters, the first MCU 30 controls the modulator 25 and the FPGA 24 to set or adjust the modulation parameters and resolution for generating the DVB-T signal. After setting the various settings, the transmitter module 2 sends an execution acknowledgement to the receiver module 3. Upon receiving the execution acknowledgement, the receiver module 3 sets its demodulation parameters to be used to receive and process DVB-T signals. The receiver module 3 continues to receive and process the DVB-T signal and monitor the SNR and/or BER as well as decoding error rate, and continues to quantify them into the first and second reference data and use them to determine the control parameters and forward the control parameters to the transmitter module 2.

It should be noted that in the above embodiment, the control parameters are determined by the receiver module 3; but in other embodiments, the control parameters can be determined by the transmitter module 2. In such a case, the receiver module 3 transmits the first and second reference data to the transmitter module 2; the transmitter module 2 determines the control parameters based on the first and second reference data, and uses the control parameters to set the modulation parameters and resolution for the DVB-T signal.

Another embodiment of the present invention provides a modulation method applicable in the DVB-T system 1 described above. The modulation method has two implementations, described below.

Figure 4A:
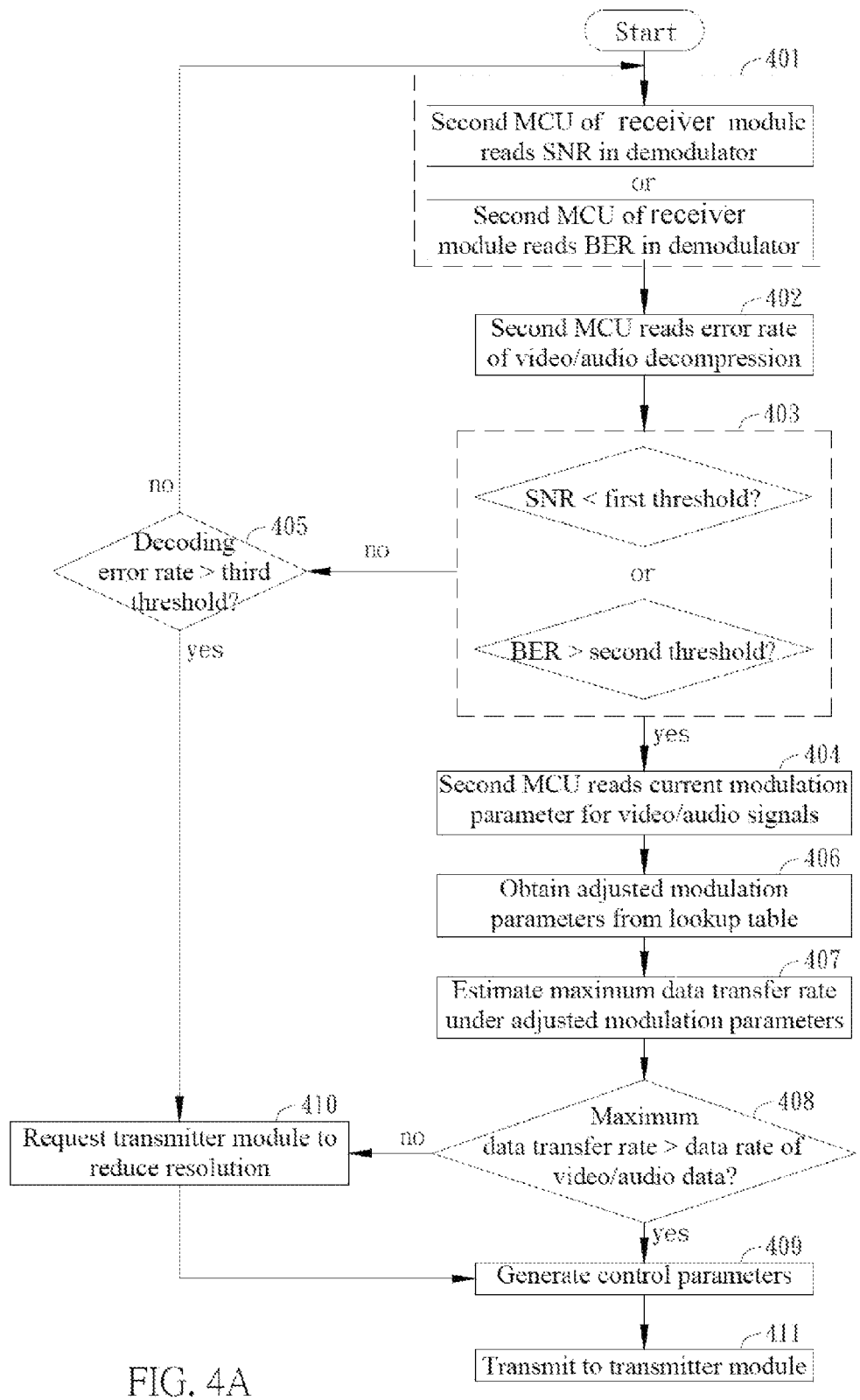
FIGS. 4A-4C illustrate a flowchart showing a modulation method according to an embodiment of the present invention.

In the first implementation, the control parameters are determined by the receiver module 3. Please refer to FIGS. 2, 3 and 4A-4C. As shown in FIG. 4A, in step 401, the second MCU 37 of the receiver module 3 obtains, from the demodulator 33, at least one of the signal-to-noise ratio (SNR) value and the bit error rate (BER) value of the DVB-T signal. In step 402, the second MCU 37 obtains, from the data decompressor 34, the decoding error rate value when the data decompressor 34 decodes the DVB-T signal into the digital video and audio data. In step 403, the second MCU 37 determines whether the SNR value is less than a first predetermined threshold or whether the BER value is greater than a second predetermined threshold. If the determination is affirmative (for either value), then in step 404, the second MCU 37 obtains the current modulation parameters for generating the video and audio data. Then, in step 406, the adjusted modulation parameters are obtained, for example, by using a lookup table. In step 407, the maximum data transmission rate of the transmitter module 2 after the adjustment is estimated, e.g. from the lookup table. In step 408, it is determined whether this maximum data transmission rate is greater than the current data rate of the video and audio data. If it is, then step 409 is carried out to generate control parameters based on the adjusted modulation parameters. In step 411, the modulation parameters are transmitted to the transmitter module 2. On the other hand, if the determination in step 403 is negative (for both values), then step 405 is carried out to determine whether the decoding error rate is greater than a third predetermined threshold. If it is, then the second MCU 37 sets a reduced image resolution to be used by the transmitter module 2, and in step 409, the control parameters are generated based on reduced resolution. In step 411, the modulation parameters are transmitted to the transmitter module 2. Similarly, in step 408, if the determination is negative, it means that the current resolution is too high for the maximum data transmission rate, so the second MCU 37 sets a reduced resolution to be used by the transmitter module 2 in step 410, then carries out steps 409 and 411.

As mentioned earlier, the adjusted modulation parameters can be obtained by using a lookup table, i.e. by looking up a pre-set table such as Table 1 below. The lookup table can be established by the user or provided by the manufacturer. The adjustable parameters generally include bandwidth, guard interval, code rate, quadrature phase shift keying (QPSK), 16-quadrature amplitude modulation (16-QAM), 64-quadrature amplitude modulation (64-QAM), etc. It should be noted that selecting one of the QPSK, 16-QAM and 64-QAM is sufficient, since the difference among them is only in the different transmission rate.

TABLE 1

| bandwidth | guard interval | code rate | QPSK | 16-QAM | 64-QAM |
|---|---|---|---|---|---|
| 5M | 1/4 | 1/2 | 3110294 | 6220588 | 9330882 |
| 5M | 1/4 | 2/3 | 4147059 | 8294118 | 12441176 |
| 5M | 1/4 | 3/4 | 4665441 | 9330882 | 13996324 |
| 5M | 1/4 | 5/6 | 5183824 | 10367647 | 15551471 |
| 5M | 1/4 | 7/8 | 5443015 | 10886029 | 16329044 |
| 5M | 1/8 | 1/2 | 3455882 | 6911765 | 10367647 |
| 5M | 1/8 | 2/3 | 4607843 | 9215686 | 13823529 |
| 5M | 1/8 | 3/4 | 5183824 | 10367647 | 15551471 |
| 5M | 1/8 | 5/6 | 5759804 | 11519608 | 17279412 |
| 5M | 1/8 | 7/8 | 6047794 | 12095588 | 18143382 |
| 5M | 1/16 | 1/2 | 3659170 | 7318339 | 10977509 |
| 5M | 1/16 | 2/3 | 4878893 | 9757785 | 14636678 |
| 5M | 1/16 | 3/4 | 5488754 | 10977509 | 16466263 |
| 5M | 1/16 | 5/6 | 6098616 | 12197232 | 18295848 |
| 5M | 1/16 | 7/8 | 6403547 | 12807093 | 19210640 |
| 5M | 1/32 | 1/2 | 3770053 | 7540107 | 11310160 |
| 5M | 1/32 | 2/3 | 5026738 | 10053476 | 15080214 |
| 5M | 1/32 | 3/4 | 5655080 | 11310160 | 16965241 |
| 5M | 1/32 | 5/6 | 6283422 | 12566845 | 18850267 |

TABLE 1-continued

| bandwidth | guard interval | code rate | QPSK | 16-QAM | 64-QAM |
|---|---|---|---|---|---|
| 5M | 1/32 | 7/8 | 6597594 | 13195187 | 19792781 |
| 6M | 1/4 | 1/2 | 3732353 | 7464706 | 11197059 |
| 6M | 1/4 | 2/3 | 4976471 | 9952941 | 14929412 |
| 6M | 1/4 | 3/4 | 5598529 | 11197059 | 16795588 |
| 6M | 1/4 | 5/6 | 6220588 | 12441176 | 18661765 |
| 6M | 1/4 | 7/8 | 6531618 | 13063235 | 19593853 |
| 6M | 1/8 | 1/2 | 4147059 | 8294118 | 12441176 |
| 6M | 1/8 | 2/3 | 5529412 | 11058824 | 16588235 |
| 6M | 1/8 | 3/4 | 6220588 | 12441176 | 18661765 |

For example, assume that the required data transmission rate for a current signal to be transmitted, a video signal of 1080i at 60 Hz and audio signal, is 14 Mbps. The SNR threshold (the first threshold) is currently set at 30 dB and the BER threshold (the second threshold) is currently set at $10^{-5}$. The initial modulation setting is: bandwidth: 6M; guard interval: 1/4; code rate: 2/3; and 64-QAM. Under such a setting, the maximum data rate is 14929412 bps (approximately 14.9 Mbps). In other words, under the current modulation setting, the corresponding maximum possible data transmission rate is about 14.9 Mpbs, as shown in Table 1. The resolution and threshold values used above are only examples, and other examples may be used.

Now, if the displayed image quality is degraded due to factors such as distance, noise, aging of the transmission wires, etc., for example, if the current SNR for the DVB-T single is detected to be lower than the first threshold 30 dB, or the BER is greater than the second threshold $10^{-5}$, the system will adjust the modulation setting based on the lookup table, for example by selecting a new setting that gives a maximum data transmission rate closest to that for the current setting. In this example, the following two settings may be selected: first: bandwidth: 5M; guard interval: 1/16; code rate: 2/3; and 64-QAM, which gives a maximum data transmission rate of Ser. No. 14/636,670 bps (approximately 14.6 Mbps); second: bandwidth: 5M; guard interval: 1/32; code rate: 2/3; and 64-QAM, which gives a maximum data transmission rate of Ser. No. 15/080,214 bps (approximately 15.0 Mbps). The maximum data transmission rate of either 14.6 Mbps or 15.0 Mbps can accommodate the 14 Mbps data transmission rate needed for the current video signal of 1080i at 60 Hz and the audio signal. Therefore, it is not necessary to reduce the resolution. After obtaining the adjusted modulation parameters, the receiver module 3 packages the new modulation parameters into control parameters and transmits them to the transmitter module 2. In step 406, it should be noted that the receiver module 3 itself in fact does not adjust the modulation parameters; it obtains the parameters that should be used by the transmitter module 2 and transmits them (in the form of control parameters) to the transmitter module 2. If, after the transmitter module 2 starts to use the new modulation parameters, the SNR and/or BER satisfy the thresholds (SNR above first threshold, and/or BER below second threshold), the adjustment process is completed (the receiver module may transmits an acknowledgement to the transmitter module).

On the other hand, if after the above adjustment, the SNR is still below the first threshold 30 dB and/or the BER is still above the second threshold $10^{-5}$, then the receiver module 3 continues to select other new modulation settings using the lookup table. However, if the selected setting gives a maximum data transmission rate less than the required 14 Mbps rate for the video and audio signals—for example, the setting of bandwidth: 5M; guard interval: 1/4, code rate: 1/4, and 64-QAM selection will give a maximum data transmission rate of Ser. No. 13/996,324 bps (approximately 13.9 Mbps)—then this means that the transmission channel cannot handle the data transmission rate for the current resolution (14 Mbps). In such a case, the receiver module 3 will require the transmitter module 2 to reduce the image resolution, for example, to reduce it to a video signal of 720P at 60 Hz and the audio signal. At this resolution, the required data transmission rate is only about 10 Mbps, which can be adequately handled by the transmission channel. If, after the transmitter module 2 starts to use the new modulation parameters, the SNR and/or BER satisfy the thresholds, the adjustment process is completed.

Figures 4B, 4C:
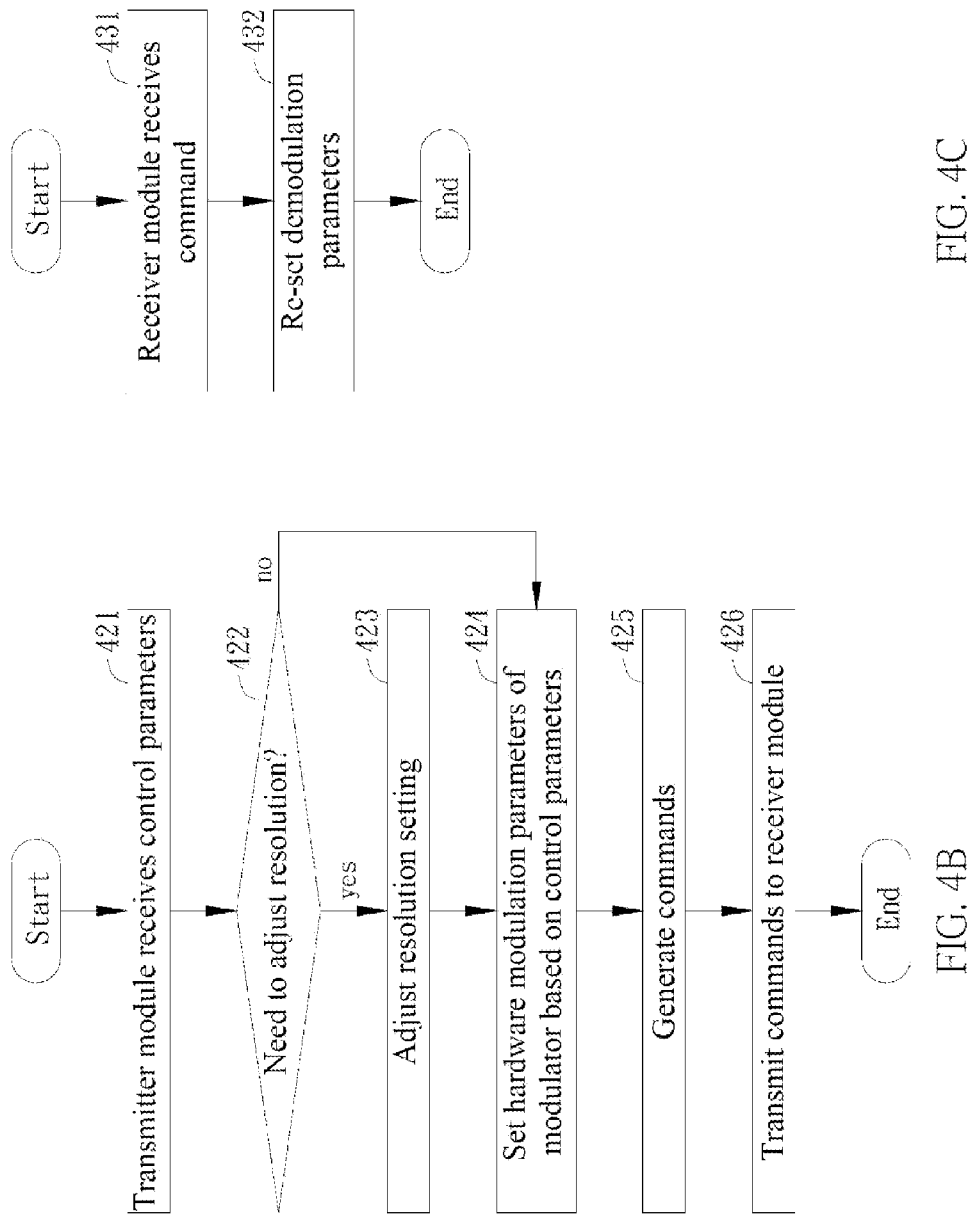

FIG. 4B illustrates the process carried out by the transmitter module 2. In step 421, the transmitter module 2 receives the control parameters from the receiver module 3. In step 422, it determines whether the control parameters include parameters that requires adjusting the image resolution. If not, the process goes to step 424, which sets the hardware modulation parameters of the data compressor 23 based on the control parameters. If the determination in step 422 is affirmative, then the process goes to step 423, which changes the image resolution setting via the FPGA 24, and then goes to step 424. In step 425, a command (execution acknowledgement command) is generated, and in step 426, this command is transmitted back to the receiver module 3.

Then, as shown in FIG. 4C, in step 431, the receiver module 3 receives the execution acknowledgement command from the transmitter module 2, and in step 432, the receiver module 3 re-sets the demodulation parameters it uses to process the received signal. The demodulation re-set parameters corresponds to the adjusted modulation parameters obtained in step 406. This completes one round of adjustment. The processes shown in FIGS. 4A, 4B and 4C are repeated; in other words, after one round of adjustment, the receiver module 3 will continue to monitor the SNR and BER to determine whether further adjustment is needed, until the SNR and BER values are satisfactory.

It should be noted that there are no absolute rules regarding how to select the modulation parameters. Theoretically, in the parameter table (e.g. Table 1), for the same row of parameters, going from the right to the left (e.g., 64-QAM to 16-QAM) will generally improve the SNR of the DVB-T signal; for the column of parameters, going from lower to higher will generally improve the SNR of the DVB-T signal. In practice, the situation is not always ideal. Therefore, in preferred embodiments of the present invention, the adjustment will attempt to make maintaining data transmission rate a priority, to avoid reducing the image resolution.

Figure 5A:
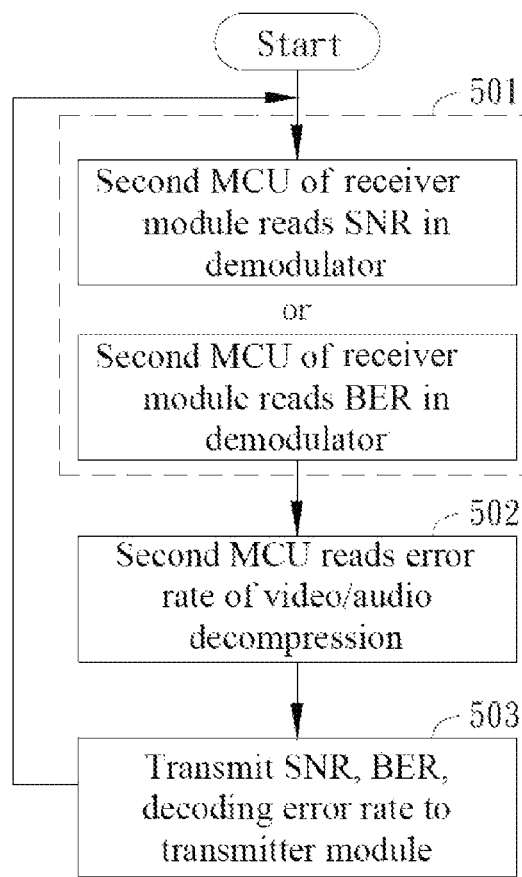
FIGS. 5A-5C illustrate a flowchart showing a modulation method according to another embodiment of the present invention.

In another embodiment of the present invention, the control parameters are determined by the transmitter module 2. Please refer to FIGS. 2, 3 and 5A to 5C. As shown in FIG. 5A, in step 501, the second MCU 37 of the receiver module 3 obtains at least one of the SNR or BER values of the DVB-T signal from the demodulator 33. In step 502, the second MCU 37 obtains from the data decompressor 34 the decoding error rate in decompressing the DVB-T signal to the video and audio signal. In step 503, the receiver module 3 transmits, via the second bi-directional communication module 36 and the second channel coupler 31, the above obtained values to transmitter module 2 via the transmission wires 4.

Figure 5B:
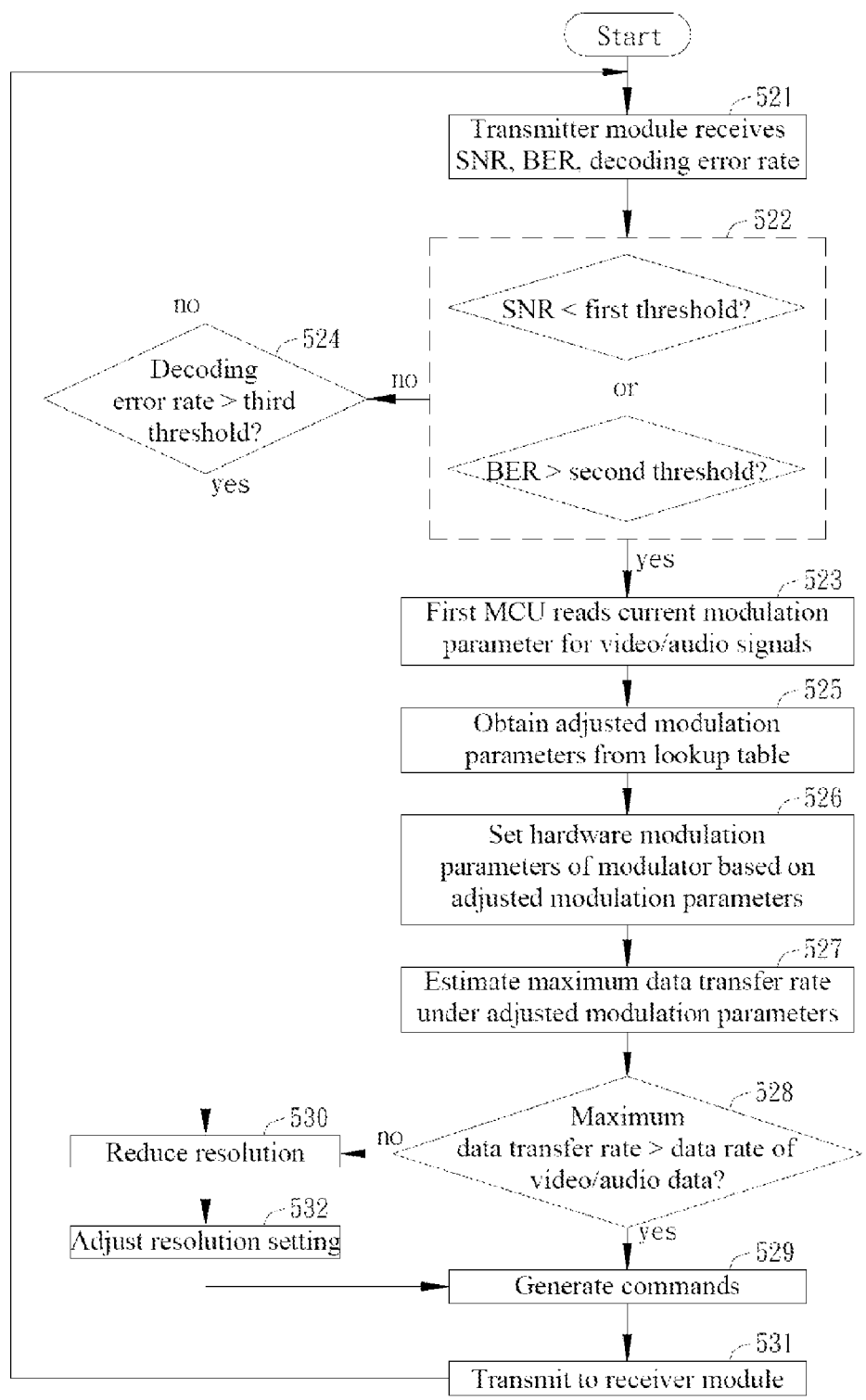

Then, as shown in FIG. 5B, in FIG. 521, the transmitter module 2 receives the data from the receiver module 3. In step 522, the first MCU 30 determines whether the SNR is less than a predetermined first threshold or whether the BER is greater than a predetermined second threshold. If so, in step 523, the first MCU 30 obtains the current modulation parameters for the modulation the video and audio signal. In step 525, determining the adjusted modulation parameters, for example by using a lookup table. In step 526, the hardware modulation parameters of the modulator 25 are set based on the adjusted modulation parameters obtained in the previous step. In step 527, the maximum data transmission rate of the transmitter module 2 after the adjustment is estimated, e.g. from the lookup table. In step 528, it is determined whether this maximum data transmission rate is greater than the data rate of the current video and audio signal. If it is, then step 529 is carried out to generate a command (execution acknowledgement command) based on the adjusted modulation parameters, which requests the receiver module 3 to re-set the modulation parameters. In step 531, the command is transmitted to the receiver module 3.

If the determination in step 522 is negative (for both values), then step 524 is carried out to determine whether the decoding error rate is greater than a third predetermined threshold. If it is, then the first MCU 30 sets a reduced image resolution: In step 530, the resolution is reduced, and in step 532, the resolution setting of the FPGA 24 is adjusted. The process proceeds to step 529 and 531 to generate a command and transmits it to the receiver module 3. Similarly, in step 528, if the determination is negative, it means that the current resolution is too high for the maximum data transmission rate, so the first MCU 30 will set a reduced resolution, via steps 530, 532, 529 and 531.

Figure 5C:
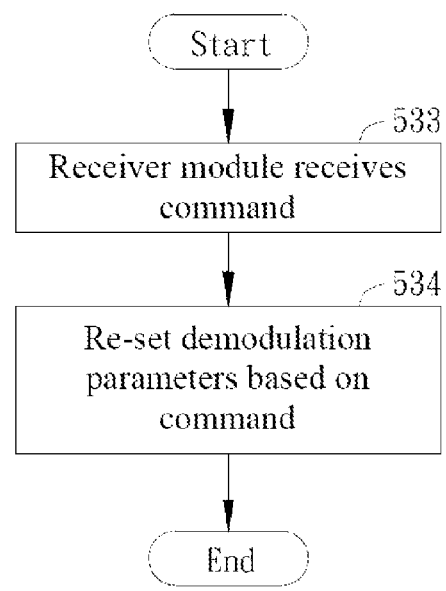

Then, as shown in FIG. 5C, in step 533, the receiver module 3 receives the command from the transmitter module 2, and carries out step 534 to re-set the demodulation parameters based on the command. This completes one round of automatically adjusting the modulation and resolution parameters. The examples of table lookup discussed in the earlier embodiment similarly applies to this embodiment and will not be repeated.

Compares to the conventional technologies, the DVB-T system and modulation method thereof can automatically adjust the modulation and image resolution. This alleviates the difficulties of manual adjustment. For example, when the wires age and affect the display quality, this can be automatically discovered and adjusted, to maintain a stable image display. Even when the setting, distance, noise and wire aging factors are all contributing factors, the settings can be automatic adjusted via automatic monitoring.

It will be apparent to those skilled in the art that various modification and variations can be made in the DVB-T system and related modulation method of the present invention without departing from the spirit or scope of the invention. Thus, it is intended that the present invention cover modifications and variations that come within the scope of the appended claims and their equivalents.

What is claimed is:

1. A digital video broadcasting-terrestrial (DVB-T) system, comprising:
a transmitter module, for modulating a digital video signal into a digital video broadcasting-terrestrial (DVB-T) signal, comprising:
a first low-pass filter;
a first bi-directional communication module, coupled to the first low-pass filter; and
a first microcontroller unit (MCU), coupled to the first bi-directional communication module; and a receiver module, for receiving the DVB-T signal and demodulating it into the digital video signal for output, comprising:
a second low-pass filter;
a second bi-directional communication module, coupled to the second low-pass filter; and
a second MCU, coupled to the second bi-directional communication module,
the receiver module monitoring at least one of a signal-to-noise ratio (SNR) value and a bit error rate (BER) value of the DVB-T signal and obtaining adjusted modulation parameters based on the SNR or BER value;
wherein the receiver module determines control parameters for setting modulation parameters and image resolution for the DVB-T signal based on the adjusted modulation parameters, and transmits the control parameters to the transmitter module,
wherein the transmitter module sets hardware modulation parameters for a modulator based on the control parameters, generates an acknowledgement command which indicates that the transmitter module has set the hardware modulation parameters, and transmits the acknowledgement command to the receiver module; and
wherein the receiver module receives the acknowledgement command from the transmitting module which indicates that the transmitter module has set the hardware modulation parameters, and thereafter, in response to receiving the acknowledgement command from the transmitting module, re-sets demodulation parameters which correspond to the adjusted modulation parameters,
wherein the transmitter module and the receiver module are coupled to each other by transmission wires which transmit the DVB-T signal, the control parameters and the acknowledgement command.

2. The DVB-T system of claim 1, the receiver module further monitoring a decoding error rate for the DVB-T signal.

3. The DVB-T system of claim 2, wherein the transmitter module comprises:
a mixer;
a modulator, coupled to the mixer;
a data compressor, coupled to the modulator;
a first channel coupler, coupled to the mixer;
wherein the first low-pass filter is coupled to the first channel coupler;
wherein the first microcontroller unit (MCU) is further coupled to the modulator and the mixer;
an FPGA (field-programmable gate array), coupled to the first MCU and the data compressor;
a first audio codec, coupled to the data compressor; and
a first video interface, coupled to the FPGA.

4. The DVB-T system of claim 2, wherein the receiver module comprises:
a tuner;
a demodulator, coupled to the tuner;
a data decompressor, coupled to the demodulator;
a second channel coupler, coupled to the tuner;
wherein the second low-pass filter is coupled to the second channel coupler;
wherein the second MCU is further coupled to the data decompressor, the demodulator and the tuner;
a second audio codec, coupled to the data decompressor; and a second video interface, coupled to the data decompressor.

5. The DVB-T system of claim 2, wherein the receiver module determines control parameters for setting modulation parameters and image resolution for the DVB-T signal further based on the decoding error rate.

6. A modulation method for a digital video broadcasting-terrestrial (DVB-T) system, the DVB-T system including at least a transmitter module and a receiver module, the transmitter module and the receiver module being coupled to each other via transmission wires, the method comprising:
a microcontroller unit (MCU) of the receiver module obtaining at least one of a signal-to-noise ratio (SNR) value and a bit error rate (BER) value of the DVB-T signal from a demodulator;
the receiver module determining whether the SNR value is less than a first threshold or the BER value is greater than a second threshold;
the MCU obtaining current modulation parameters for generating a video and audio signal;
the receiver module obtaining adjusted modulation parameters based on the SNR or BER value;
the receiver module estimating a maximum data transmission rate under the adjusted modulation parameters;
the receiver module determining whether the maximum data transmission rate is greater than a current data rate of the video and audio signal;
if the maximum data transmission rate is determined to be greater than the current data rate, the receiver module generating control parameters based on the adjusted modulation parameters and transmitting the control parameters to the transmitter module;
the transmitter module receiving the control parameters;
the transmitter module determining whether an image resolution of the video data is to be adjusted;
if the image resolution of the video data is to be adjusted, the transmitter module adjusting settings of the image resolution;
the transmitter module setting hardware modulation parameters for a modulator based on the control parameters;
the transmitter module generating an acknowledgement command which indicates that the transmitter module has set the hardware modulation parameters, and transmitting it to the receiver module;
the receiver module receiving the acknowledgement command from the transmitting module which indicates that the transmitter module has set the hardware modulation parameters; and
thereafter, in response to receiving the acknowledgement command from the transmitting module, the receiver module re-setting demodulation parameters which correspond to the adjusted modulation parameters.

7. The method of claim 6, further comprising:
the MCU obtaining a decoding error rate for decompressing the video and audio signal.

8. The method of claim 7, further comprising:
if the SNR is greater than the first threshold or the BER is less than the second threshold, the receiver module determining whether the decoding error rate is greater than a third threshold; and
if the decoding error rate is greater than the third threshold, the receiver module requesting the transmitter module to reduce the image resolution.

9. The method of claim 6, further comprising:
if the maximum data transmission rate is determined to be less than the current data rate, the receiver module requesting the transmitter module to reduce the image resolution.

10. A modulation method for a digital video broadcasting-terrestrial (DVB-T) system, the DVB-T system including at least a transmitter module and a receiver module, the transmitter module and the receiver module being coupled to each other via transmission wires, the method comprising:
a second microcontroller unit (MCU) of the receiver module obtaining at least one of a signal-to-noise ratio (SNR) value and a bit error rate (BER) value of the DVB-T signal from a demodulator;
the receiver module transmitting the SNR and BER values to the transmitter module;
the transmitter module receiving the SNR and BER values from the receiver module;
the transmitter module determining whether the SNR value is less than a first threshold or the BER value is greater than a second threshold;
a first MCU of the transmitter module obtaining current modulation parameters for modulating a video and audio signal to generate the DVB-T signal;
the transmitter module obtaining adjusted modulation parameters;
the transmitter module setting hardware modulation parameters for a modulator based on the adjusted modulation parameters;
the transmitter module estimating a maximum data transmission rate under the adjusted modulation parameters;
the transmitter module determining whether the maximum data transmission rate is greater than a current data rate of the video and audio signal;
if the maximum data transmission rate is determined to be greater than the current data rate, the transmitter module generating an acknowledgement command based on the adjusted modulation parameters, and transmitting it to the receiver module;
the receiver module receiving the acknowledgement command from the transmitting module; and
thereafter, in response to receiving the acknowledgement command from the transmitter module, the receiver module re-setting demodulation parameters based on the acknowledgement command.

11. The method of claim 10, further comprising:
the second MCU further obtaining a decoding error rate when the receiver module decodes the DVB-T signal and transmitting the decoding error rate to the transmitter module.

12. The method of claim 11, further comprising:
if the SNR is greater than the first threshold or the BER is less than the second threshold, the transmitter module determining whether the decoding error rate is greater than a third threshold; and
if the decoding error rate is greater than the third threshold, the transmitter module adjusting settings of the image resolution to a reduced image resolution.

13. The method of claim 11, further comprising:
if the maximum data transmission rate is determined to be less than the current data rate, the transmitter module adjusting settings of the image resolution to a reduced image resolution.

14. A digital video broadcasting-terrestrial (DVB-T) system, comprising:
- a transmitter module, for modulating a digital video signal into a digital video broadcasting-terrestrial (DVB-T) signal, comprising:
  - a first low-pass filter;
  - a first bi-directional communication module, coupled to the first low-pass filter; and
  - a first microcontroller unit (MCU), coupled to the first bi-directional communication module; and
- a receiver module, for receiving the DVB-T signal and demodulating it into the digital video signal for output, comprising:
  - a second low-pass filter;
  - a second bi-directional communication module, coupled to the second low-pass filter; and
  - a second MCU, coupled to the second bi-directional communication module,
- the receiver module monitoring at least one of a signal-to-noise ratio (SNR) value and a bit error rate (BER) value of the DVB-T signal and transmitting the SNR or BER value to the transmitter module;
- wherein the transmitter module determines adjusted modulation parameters based on the SNR or BER value received from the receiver, sets hardware modulation parameters for a modulator based on the adjusted modulation parameters for modulating a video and audio signal to generate the DVB-T signal, generates an acknowledgement command based on the adjusted modulation parameters, and transmits the acknowledgement command to the receiver module;
- wherein the receiver module receives the acknowledgement command from the transmitting module, and thereafter, in response to receiving the acknowledgement command from the transmitter module, re-sets demodulation parameters based on the acknowledgement command, and
- wherein the transmitter module and the receiver module are coupled to each other by transmission wires for transmitting the DVB-T signal, the SNR or BER value, and the acknowledgement command.

15. The DVB-T system of claim 14, the receiver module further monitoring a decoding error rate for the DVB-T and transmitting the decoding error rate to the transmitter module.

16. The DVB-T system of claim 15, wherein the transmitter module comprises:
- a mixer;
- a modulator, coupled to the mixer;
- a data compressor, coupled to the modulator;
- a first channel coupler, coupled to the mixer;
- wherein the first low-pass filter is coupled to the first channel coupler;
- wherein the first microcontroller unit (MCU) is further coupled to the modulator and the mixer;
- an FPGA (field-programmable gate array), coupled to the first MCU and the data compressor;
- a first audio codec, coupled to the data compressor; and
- a first video interface, coupled to the FPGA.

17. The DVB-T system of claim 15, wherein the receiver module comprises:
- a tuner;
- a demodulator, coupled to the tuner;
- a data decompressor, coupled to the demodulator;
- a second channel coupler, coupled to the tuner;
- wherein the second low-pass filter is coupled to the second channel coupler;
- wherein the second MCU is further coupled to the data decompressor, the demodulator and the tuner;
- a second audio codec, coupled to the data decompressor; and
- a second video interface, coupled to the data decompressor.

18. The DVB-T system of claim 15, wherein the transmitter module determines image resolution setting for the DVB-T signal based on the decoding error rate received from the receiver module.

* * * * *